(12) United States Patent
Willig et al.

(10) Patent No.: US 7,180,598 B2
(45) Date of Patent: Feb. 20, 2007

(54) PHOTONIC CRYSTAL INTERFEROMETRIC FIBER OPTICAL GYROSCOPE SYSTEM

(75) Inventors: Reinhardt L. Willig, Maynard, MA (US); William P. Kelleher, Acton, MA (US); Stephen P. Smith, Medford, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 170 days.

(21) Appl. No.: 10/712,702

(22) Filed: Nov. 13, 2003

(65) Prior Publication Data

US 2004/0263856 A1    Dec. 30, 2004

Related U.S. Application Data

(60) Provisional application No. 60/426,264, filed on Nov. 13, 2002.

(51) Int. Cl.
*G01C 19/72* (2006.01)
*G02B 6/00* (2006.01)

(52) U.S. Cl. .................................. 356/460; 385/12
(58) Field of Classification Search ................ 356/460, 356/464; 250/227.19, 227.27; 385/12
See application file for complete search history.

(56) References Cited

U.S. PATENT DOCUMENTS 4,773,759 A * 9/1988 Bergh et al. ................ 356/460
5,802,236 A * 9/1998 DiGiovanni et al. ........ 385/127
6,243,522 B1 * 6/2001 Allan et al. .................. 385/123
6,334,019 B1 * 12/2001 Birks et al. .................. 385/125
2004/0061863 A1 * 4/2004 Digonnet ..................... 356/460
2006/0145063 A1 * 7/2006 Steinberg et al. ...... 250/227.18

OTHER PUBLICATIONS

Sagnac loop interferometer based on polarization maintaining photonic crystal fiber with reduced temperature sensitivity, Kim et al, Optics Express, Sep. 2004.*

* cited by examiner

*Primary Examiner*—Gregory J. Toatley, Jr.
*Assistant Examiner*—Patrick Connolly
(74) *Attorney, Agent, or Firm*—Iandiorio & Teska

(57) ABSTRACT

A photonic crystal interferometric optical gyroscope system including a light source for providing a primary beam of light, a photonic crystal sensing coil having a rotational axis, and a beam controlling device configured to split the primary beam into first and second counter-propagating beams in the photonic crystal sensing coil and configured to direct return of the counter-propagating beams wherein the power of the returning counter-propagating beams represents the phase shift between the counter-propagating beams and is indicative of the rate of rotation of the coil about the rotational axis.

84 Claims, 8 Drawing Sheets

PHOTONIC CRYSTAL INTERFEROMETRIC FIBER OPTICAL GYROSCOPE SYSTEM

RELATED APPLICATIONS

This application claims priority of U.S. Provisional Application No. 60/426,264 filed Nov. 13, 2002, incorporated by reference herein.

GOVERNMENT RIGHTS

This invention was made with U.S. Government support under Contract No. N00030-01-C-0022 awarded by the U.S. Navy. The Government may have certain rights in the subject invention.

FIELD OF THE INVENTION

This invention relates generally to gyroscope systems and more particularly to an improved photonic crystal interferometric fiber optical gyroscope (IFOG) system.

BACKGROUND OF THE INVENTION

Gyroscopes may be used to measure an angular change in direction. Conventional IFOGs employ, inter alia, a sensing coil to measure the rate of rotation of the gyroscope. The sensing coil of the IFOG typically includes an optical fiber wound on a mandrel or into a freestanding coil. Light is introduced to the rotating sensing coil and an optical splitter splits the light into two counter-propagating beams. One beam is propagated in the same direction as the rotating coil and the other beam is propagated in the direction opposite the direction of the rotating coil. Because light propagating in the same direction of rotation as the sensing coil travels a longer distance than the light propagating in the opposite direction of the sensing coil, a phase shift results when the counter propagating beams return to the optical splitter. A detector is used to measure the power of the counter-propagating beams of light which represents the phase shift between the two counter-propagating beams. The relative phase shift of the counter-propagating beams is indicative of the rate of rotation of the sensing coil about its axis. The fundamental measure of the precision of the rate of rotation of an IFOG is known as angle random walk (ARW), measured in degrees per square root hours (degree/$\sqrt{hr}$). The ability to measure power of the counter-propagating beams represents the sensitivity of the IFOG.

For a sensing coil with a fixed volume and low-loss optical fiber, the precision of an IFOG, as indicated by the ARW, is proportional to the square of the fiber diameter. This is because the ARW is inversely proportional to the length of the fiber in the sensing coil and the length of the fiber is inversely proportional to the square of the fiber diameter. Hence, the ARW of the sensing coil can be improved by using fiber with a reduced diameter and/or increased length. The ARW can also be improved by increasing the spectral width of the light source of the IFOG because the ARW of an IFOG is inversely proportional to the square root of the spectral width. Hence, increasing the spectral width of the light source reduces the ARW. However, the light source of a conventional IFOG is limited by the bandwidth of the fiber. A conventional optical fiber could be deigned to have a bandwidth of several hundred nanometers. However, increasing the bandwidth increases the bend loss in the fiber. In practice, when a conventional fiber is employed in an IFOG, the fiber is typically designed to have a bandwidth of less than 100 nm to minimize bend loss of the fiber.

One technique to improve sensitivity of an IFOG is to increase the number of turns of the optical fiber in the sensing coil thereby increasing the length of the optical fiber which increases the phase difference between the counter propagating beams of light in the sensing coil. Increasing the phase difference between the counter-propagating beams changes the power such that the ability of the detector to measure the power improves, thereby improving the sensitivity of the IFOG. However, increasing the number of turns of optical fiber in the sensing coil increases the size of the sensing coil, which increases package diameter of the IFOG. A typical prior IFOG manufactured with conventional optic fiber would have a package diameter of about 3 inches.

Typical conventional optical fibers employed in the sensing coils of prior IFOGs include a solid center core surrounded by a solid clad. The solid core is used to transmit light while the clad reflects the light within the core. Typically, the optical fiber is designed such that the index of refraction of the core ($n_1$) is greater than the index of refraction of the clad ($n_2$) thereby totally reflecting the light at the core-cladding interface. However, the conventional optical fibers utilized in the sensing coils of prior IFOGs have significant loss of light (bend loss) due to bending associated with winding the fiber into a sensing coil, which decreases both the accuracy and precision of the IFOG.

The majority of prior IFOG sensing coils are made with glass fibers that are made with silica ($SiO_2$). For silica based fibers, the index difference needed to confine the light within the core is accomplished by either adding a dopant to the core of the fiber (up-doping) or adding a dopant to the cladding of the fiber (down-doping). For example, germanium or phosphorus may be added to the core of the fiber (up-doped) or fluorine or boron may be added to the cladding (down-doped).

One prior attempt to overcome the large bend loss associates with conventional optical fibers utilized in sensing coils of prior IFOGs is to increase the index difference between the core and the clad, e.g., the index difference between $n_1$ and $n_2$. Increasing the index difference decreases the bend loss because it increases the degree to which light is confined inside the core of fiber.

The most common fiber used in conventional IFOG sensing coils is a silica based fiber where the core is up-doped with germanium. The bend loss in the sensing coils made with these fibers can be decreased by increasing the amount of germanium in the core. However, there are two limitations to up-doping the core. First, the amount of index change that can be obtained by doping silica with germanium is less than ten percent. Second, because the material properties of doped silica are different from those of undoped silica, the manufacturing process used to make the fiber introduces more and more defects as the amount of germanium is increased. These defects increase the amount of light absorbed by the fiber per unit length.

Another drawback to conventional IFOG sensing coils made with germanium doped optical fiber is that this fiber can be damaged by gamma radiation. Most dopants, like germanium, increase the degree to which gamma radiation causes ionization in the fiber. This ionization increases the optical loss of the fiber and hence decreases the precision of the IFOG.

One prior art attempt to overcome the gamma radiation sensitivity and the length loss problems associated with germanium doped optical fibers is to dope the clad with fluorine to decrease the index of refraction of the clad $n_2$ (e.g., increase the difference of the index of refraction between $n_1$ and $n_2$ by decreasing $n_2$). Fluorine absorbs less light and less gamma radiation than germanium. However, there is a limit to the difference between the index of refraction between the core ($n_1$) and the clad ($n_2$), hence, fluorine doped fibers have limited ability to reduce bend loss.

Conventional optical fibers utilized in the sensing coil of prior IFOGs are also thermal and ionization radiation sensitive.

SUMMARY OF THE INVENTION

It is therefore an object of this invention to provide a photonic crystal interferometric fiber optical gyroscope system.

It is a further object of this invention to provide such a system which is more accurate.

It is a further object of this invention to provide such a system which is more sensitive.

It is a further object of this invention to provide such a system which reduces the ARW.

It is a further object of this invention to provide such a system which increases the usable spectral width of the light source.

It is a further object of this invention to provide such a system which reduces bend loss.

It is a further object of this invention to provide such a system which reduces length loss.

It is a further object of this invention to provide such a system which reduces sensitivity to ionization radiation.

It is a further object of this invention to provide such a system which reduces thermal sensitivity.

It is a further object of this invention to provide such a system which reduces thermal gradient sensitivity.

It is a further object of this invention to provide such a system which eliminates the need to use dopants in the optical fiber of the sensing coil to decrease bend loss, decrease length loss, or improve radiation sensitivity.

It is a further object of this invention to provide such a system which reduces the package size of the IFOG.

This invention results from the realization that a truly effective photonic crystal interferometric optical gyroscope system is achieved by: 1) an improved light source which provides light with an increased spectral width; 2) a unique photonic sensing coil which includes photonic optical fibers with a gas-solid structure that confines light by total internal reflection (TIR) or band gap optical fibers that confine light by employing an optical band gap; and/or 3) a beam controlling device which splits the light into counter-propagating beams in the photonic crystal sensing coil and directs the return of the counter-propagating beams whose power represents the phase shift between the counter-propagating beams which is indicative of the rate of rotation of coil.

This invention features a photonic crystal interferometric optical gyroscope system including a light source for providing a primary beam of light, a photonic crystal sensing coil having a rotational axis, and a beam controlling device configured to split the primary beam into first and second counter-propagating beams in the photonic crystal sensing coil and configured to direct return of the counter-propagating beams wherein the power of the returning counter-propagating beams represents the phase shift between the counter-propagating beams and is indicative of the rate of rotation of the coil about the rotational axis.

In a preferred embodiment, the photonic crystal sensing coil may be formed by winding a photonic crystal fiber having a gas-solid structure that confines the light by total internal reflection or may be formed by winding a band gap fiber which confines the light by employing an optical band gap. The photonic crystal fiber may be configured to maintain the polarization of the first and second counter-propagating beams. The photonic crystal fiber may be configured to propagate only one state of polarization of the first and second counter-propagating beams. The photonic crystal fiber may be configured to propagate a single mode of light. The band gap fiber may be configured to maintain the polarization of the light. The band gap fiber may be configured to propagate only one state of polarization of the light. The band gap fiber may be configured to propagate a single mode of light. The photonic crystal sensing coil may include 15,000 turns of the photonic crystal fiber or may include 35,000 turns of the photonic crystal fiber. The photonic crystal sensing coil may include 15,000 turns of the band gap fiber or may include 35,000 turns of the band gap fiber. The photonic crystal fiber may include a solid core region surrounded by solid clad having a plurality of hollow channels configured to provide an index of refraction difference between the solid core region and the clad that confines light in the core by totally reflecting light on the clad and propagates a single mode of light. The photonic crystal fiber may include a jacket surrounding the clad. The photonic crystal fiber may have an outer diameter in the range of about 20 to 250 microns. The photonic crystal fiber may have an outer diameter in the range of about 70 microns. The photonic crystal fiber may have an outer diameter of about 40 microns. The solid core and the clad may be made of silica, and/or plastic, and/or a dielectric material. The band gap fiber may include a hollow core region surrounded by a solid clad including a plurality of hollow channels configured to define a band gap which confines the majority of light in the hollow core region and propagates a single mode of light. The band gap fiber may include a jacket surrounding the clad. The band gap fiber may have an outer diameter in the range of about 20 to 250 microns. The band gap fiber may have an outer diameter of about 70 microns. The band gap fiber may have an outer diameter of about 40 microns. The clad may be made of silica, and/or plastic, and/or a dielectric material. The band gap fiber may include a hollow core region surrounded by solid clad having a plurality of alternating layers of solid dielectric material, the alternating layers of dielectric material configured to create a band gap effect that confines the majority of light in the hollow core region and propagates a single mode of light. The band gap fiber may further include a jacket surrounding the clad. The band gap fiber may have an outer diameter in the range of about 20 to 250 microns. The band gap fiber may have an outer diameter of about 70 microns. The band gap fiber may have an outer diameter of about 40 microns. The alternating layers of solid electric material may include silica and/or plastic. The alternating layers of solid electric material may include a material chosen from the group consisting of silica, doped silica, fluoride glasses, chalcogenide glasses and thermoplastic polymers. The photonic crystal fiber may include an asymmetric solid core region surrounded by a solid clad having a plurality of asymmetrically spaced hollow channels about the solid core region to provide an index of refraction difference between the core region and the clad that confines the light by totally reflecting light on the hollow channels of the clad and maintains the polarization of the light. The band gap fiber may include an asymmetric hollow region surrounded by a solid clad having a plurality of asymmetrically spaced hollow channels configured to define a band gap effect that confines the majority of light in the hollow core and maintains the polarization of the light. The band gap fiber may include an asymmetric hollow core region surrounded by a plurality of alternating asymmetric layers of solid dielectric material configured to define a band gap effect that confines the majority of light in the core region and maintains the polarization of the light. The photonic crystal fiber may include an asymmetric solid core region surrounded by a solid clad having a plurality of asymmetrically spaced hollow channels about the solid core region configured to provide an index of refraction difference between the core region and the clad that confines light by totally reflecting light on the hollow channels of the clad and propagates the one state of polarized light. The band gap fiber may include an asymmetric hollow region surrounded by a solid clad having a plurality of asymmetrically spaced hollow channels configured to define a band gap that confines the majority of light in the hollow core and propagates the one state of polarized light. The band gap fiber may include an asymmetric hollow core region surrounded by clad including a plurality of alternating asymmetric layers of solid dielectric material configured to define a band gap that confines the majority of light in the core region and propagates one state of polarized light. The photonic crystal sensing coil may have an outer diameter, an inner diameter, and a height, the outer diameter may be in the range of about 0.5 inches to 9 inches, the inner diameter may be in the range of about 0.5 to 8 inches, and the height may be in the range of about 0.25 to 4 inches. The photonic crystal sensing coil may have an outer diameter of about 2.0 inches, an inner diameter of about 1.5 inches, and a height of about 1.0 inch. The photonic crystal sensing coil may have an outer diameter of about 0.75 inches, an inner diameter of about 0.5 inches, and a height of about 0.75 inches. The photonic crystal interferometric optical gyroscope system may include an optical wave guide configured to interconnect the light source and the beam controlling device and/or the beam controlling device and photonic crystal sensing coil. The optical wave guide may be chosen from the group consisting of a solid structure wave guide that confines the light by total internal reflection, a photonic crystal wave guide having a gas-solid structure that confines the light by total internal reflection, and a band gap wave guide that confines the light by employing an optical band gap. The solid structure wave guide may be configured as an optical fiber. The photonic crystal wave guide may be configured as photonic crystal fiber. The band gap wave guide may be configured as a band gap optical fiber. The optical fiber, the photonic crystal fiber, and the band gap fiber may be configured to maintain the polarization of the light. The optical fiber, the photonic crystal fiber, and the band gap fiber may be configured to propagate only one state of polarization of the light. The optical fiber, the photonic crystal fiber, and the band gap fiber may be configured to propagate a single mode of light. The beam controlling device may include first and second optical splitters and a least one phase modulator. The first optical splitter may be a reciprocal splitter. The first optical splitter may be a non-reciprocal splitter. The first optical splitter may be configured to direct light from the light source to a coil splitter and direct the return of the first and second counter-propagating beams from the sensing coil to a light detector. The first optical splitter may be configured as a broad-band splitter to transmit light with a spectral width up to about 1500 nm. The second optical splitter may be a reciprocal splitter. The second optical splitter may be configured to divide the light from the light source into two equal the first and second counter-propagating beams. The at least one phase modulator may be configured to add a time dependent phase shift to the first and second counter-propagating beams to produce a non reciprocating phase shift between the first and second counter-propagating beams such that the first and second counter-propagating beams constructively interfere to modify the power thereby improving the precision of the system. The photonic crystal interferometric optical gyroscope system may further include a photo detector configured to convert the power to an electrical signal. The photo detector may be chosen from the group consisting of: a PIN photo detector, an avalanche photo detector, a photo multiplier tube, a bolometer, a photo resistive detector, and a photo conductive detector. The light source may provide the primary beam of light having a wavelength in the range of about 100 nm to 15,000 nm. The light source may provide the primary beam of light having a wavelength of about 1200 nm. The light source may be chosen from the group consisting of an amplified spontaneous emission light source, a stimulated emission light source, a thermally excited light source, a fluorescent light source, an electro-luminescence light source, a chemical luminescence light source, and a phosphorescence light source. The amplified spontaneous emission light source may include a semiconductor material. The amplified spontaneous emission light source may include a gas filled fiber and/or a rare earth doped fiber. The gas may be chosen from the group consisting of argon, helium neon, carbon dioxide and carbon monoxide. The amplified spontaneous light source may include a liquid filled fiber. The liquid may include an organic dopant. The stimulated emission light source may include a laser. The stimulated emission light source may be chosen from the group consisting of a helium-neon doped fiber with a cavity, an argon doped fiber with a cavity, a carbon dioxide doped fiber with a cavity, and a semiconductor material with a cavity. The thermally excited light source may include an incandescent light bulb. The fluorescent light source may include a fluorescent light bulb. The light source may be a broad-band light source which emits light with a spectral width of up to 1500 nm. The light source may be a broad-band light source which emits light with a spectral width of about 1200 nm. The photonic crystal sensing coil may have an ARW of about 0.001 degree/$\sqrt{hr}$. The photonic crystal sensing coil may have an ARW of about 0.00005 degree/$\sqrt{hr}$.

This invention further features a photonic crystal interferometric optical gyroscope system including a broad-band light source for providing a primary beam of light with increased spectral width, a photonic crystal sensing coil having a rotational axis, and a beam controlling device configured to split the primary beam into first and second counter-propagating beams in the photonic crystal sensing coil and configured to direct return of the counter-propagating beams; wherein the power of the returning counter-propagating beams represents the phase shift between the counter-propagating beams and is indicative of the rate of rotation of the coil about the rotational axis.

In one embodiment, the light source may be a tungsten-halogen light source. The primary beam of light may have a spectral width of up to about 1500 mn. The photonic crystal sensing coil may be formed by winding a photonic crystal fiber having a gas-solid structure that confines the light by total internal reflection. The photonic crystal sensing coil may be formed by winding a band gap fiber which confines the light by employing an optical band gap.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
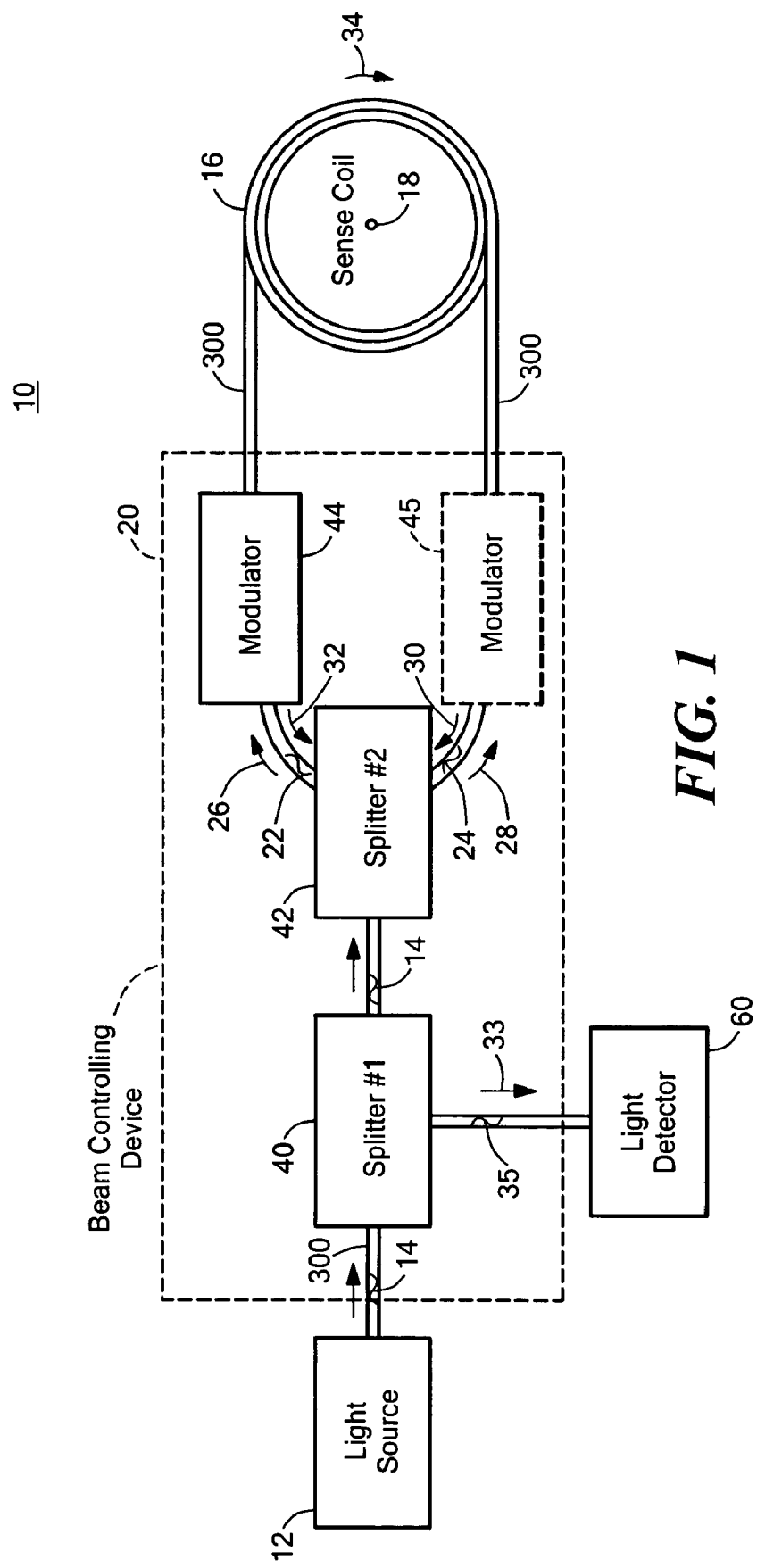
FIG. 1 is a schematic block diagram showing several of the primary components of a photonic crystal interferometric fiber optical gyroscope system in accordance with this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

As discussed in the Background section above, conventional IFOGs suffer from several distinct drawbacks including, inter alia, a limited accuracy, limited sensitivity, limited ability to reduce ARW because of the diameter associated with conventional optical fibers, and limited spectral width light sources. Conventional IFOGs also have a relatively large package diameter (e.g., about three inches in diameter). The sensing coil of conventional IFOGs also utilizes optical fibers with significant bend loss, length loss, sensitivity to ionizing radiation, and thermal sensitivity.

Photonic crystal interferometric fiber optical gyroscope (IFOG) system 10, FIG. 1 of this invention typically includes light source 12 for providing primary beam of light 14 to beam controlling device 20 and photonic crystal sensing coil 16 (discussed below). Light source 12 may be an amplified spontaneous emission light source including a rare earth-doped fiber, a gas filled fiber, a liquid filled fiber, or a semiconductor material. The gas may include argon, helium, neon, carbon monoxide or carbon dioxide, and similar gases known to those skilled in the art. The liquid may be an organic dopant, such as rhodamine, or similar organic dopants known to those skilled in the art.

In other designs, light source 12 may be a stimulated emission light source, such as a laser, a gas filled fiber with a cavity, or a semiconductor material with a cavity (e.g., an LED), or a super-luminescent semiconductor material with a cavity (e.g., an SLD). The gas may include argon, helium, neon, carbon monoxide or carbon dioxide, and similar gases known to those skilled in the art. In still other examples, light source 12 may be a thermally excited light source, such as an incandescent light source (e.g., a tungsten-halogen light source), a fluorescent light source (e.g., a fluorescent light bulb), an electro-luminescent light source, a chemical luminescent light source, a phosphorescence light source, or other broad-band light sources. In a preferred embodiment, light source 12 emits primary beam of light 14 having a wavelength of between 10 nm to 15,000 nm.

Beam controlling device 20 is configured to split primary beam 14 into counter-propagating beams 22 and 24 which travel in opposite directions in sensing coil 16. In one example, counter-propagating beam 22 travels in a clockwise direction about photonic crystal sensing coil 16, as indicated by arrow 26, and counter-propagating beam 24 travels in a counter-clockwise direction about photonic crystal sensing coil 16, as indicated by arrow 28, although this is not a necessary limitation of this invention, as the direction of the counter-propagating beams 22 and 24 may be reversed. Beam controlling device 20 is configured to direct the return of counter-propagating beams 22 and 24, indicated by arrows 30 and 32, respectively, to light detector 60 via coil splitter 42 and source splitter 40 (discussed in further detail below). The power caused by the interference of counter propagating beams 22 and 24 is measured by light detector 60 (also discussed in further detail below) and represents the phase shift between counter-propagating beams 22 and 24 which is indicative of the rate of rotation of photonic crystal sensing coil 16 about rotational axis 18, as indicated, by way of example only, by arrow 34.

Beam controlling device 20 includes source splitter 40 configured to direct light 14 from light source 12 into coil splitter 42. Source splitter 40 may be a fused-fiber coupler available from JDS Uniphase Corporation, San Jose, Calif. Source splitter 40 is also configured to direct returning counter-propagating beams 22 and 24 from photonic crystal sensing coil 16 to light detector 60, as indicated by arrow 33. In one preferred design, source splitter 40 is a wide-band directional coupler, available from AOC Technologies, Inc., Pleasanton, Calif., capable of processing light 14 (and returning counter-propagating beams 22 and 24) with increased spectral width in the range of about 10 to 1500 nm. Source splitter 40 may be a reciprocal splitter or a non-reciprocal splitter.

Beam controlling device also includes coil splitter 42 configured to divide light 14 emitted from light source 12, through source splitter 40, into two equal beams, e.g., counter-propagating beam 22 and counter-propagating beam 24. In one design, coil splitter 42 is a power splitter which is insensitive to the wavelength of light 14 (achromatic) and can process light 14 with increased spectral widths (e.g., in the range of about 10 nm to 15,000 nm). Coil splitter 42 can be custom designed with photonic crystal fiber (discussed below) or is commercially available from Gould Fiber Optics, Millersville, Md. Typically, coil splitter 42 is a reciprocal splitter.

Beam controlling device 20 also includes at least one modulator, such as modulator 44, and/or modulator 45, available from JDS Uniphase Corporation, San Jose, Calif., which is configured to add a time-dependent phase shift to first counter-propagating beam 22 and/or second counter-propagating beam 24 to produce a non-reciprocating phase shift between counter-propagating beam 22 and counter-propagating beam 24. The non-reciprocating phase shift between counter-propagating beam 22 and counter-propagating beam 24 constructively interfere (e.g., shift the power displacement) to modify the power and improve the sensitivity of photonic crystal IFOG system 10. In one design, modulator 44 and coil splitter 42 are integrated on an integrated optical chip (IOC), available from JDS Uniphase Corporation, San Jose, Calif.

Light detector 60 detects light 35 (e.g., counter propagating beams 22 and 24) from source splitter 40. Light detector 60 is configured to convert the power of interfering counter-propagating beams 22 and 24, respectively, to an electrical signal. Light-detector 60 may be a PIN photo-detector, available from EG&G Optoelectronics, Salem, Mass., an avalanche photo-detector, also available from EG&G Optoelectronics, a photo-multiplier tube, available from Hamamatsu, Bridgewater, N.J., a bolometer, available from Infrared Laboratories, Tucson, Ariz., a photo-resistive detector (also known as a photo-conductive detector), available from Hamamatsu, Bridgewater, N.J. When an electrical voltage is applied across light detector 60, the amount of electrical current drawn by light detector 60 is proportional to the amount of power on the surface of light detector 60.

Photonic crystal sensing coil 16 is typically formed by winding a photonic crystal fiber which has a gas-solid structure that confines light by total internal reflection, or with a band gap fiber which confines light by employing an optical band gap (both discussed in detail below). The gas of the gas-solid structure of the photonic crystal fiber may be air, an inert gas, or an active gas. In a preferred embodiment, the photonic crystal fiber and band gap fiber have an outer diameter of about 70 nm. Utilizing photonic crystal fibers or band gap fibers with decreased diameter to manufacture photonic crystal sensing coil 16 reduces the ARW (e.g., improves accuracy of IFOG system 10) because ARW is proportional to the square of the fiber diameter. Reducing the diameter of the optical fibers also decreases the packing size of IFOG system 10. Moreover, photonic crystal fibers and band gap fibers, as employed in accordance with this invention, also decrease bend loss and length loss of photonic crystal sensing coil 16. These fibers also are less sensitive to gamma radiation, are less thermally sensitive, and eliminate the need to use dopants to confine light in photonic crystal sensing coil 16.

Figure 2A:
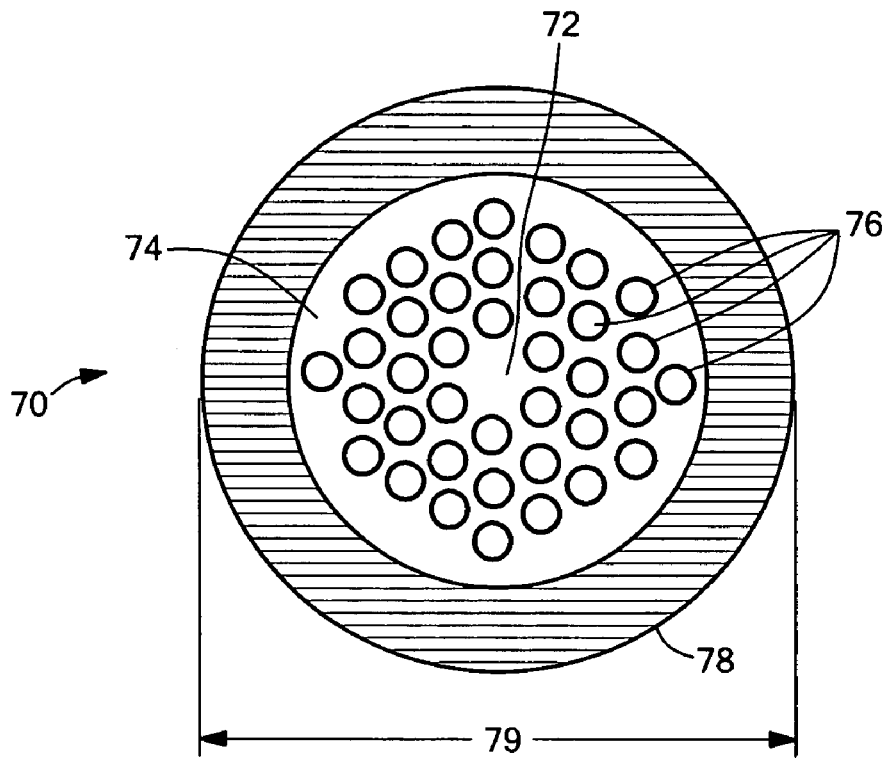
FIGS. 2A–2F are schematic two-dimensional views showing typical photonic crystal fibers and band-gap fibers employed in the photonic sensing coil and to interconnect the various components shown in FIG. 1.

Photonic crystal sensing coil 16 may be made with photonic crystal fiber 70, FIG. 2A which includes solid region 72 surrounded by solid clad 74 having a plurality of hollow channels 76 (which contain a gas, such as air, an inert gas, or an active gas) configured to provide an index of refraction difference between core region 72 and clad 74 that confines light in core 72 by totally reflecting the light on clad 72. In a preferred design, photonic crystal fiber 70 is configured to propagate a single mode of light. Photonic crystal fiber 70 may include jacket 78 surrounding clad 72. In one example, the outer diameter of photonic crystal fiber 70, indicated by arrow 79, is in the range of about 20 to 250 µm. In other preferred embodiments, the outer diameter of photonic crystal fiber 70 is about 70 µm. In other designs, the outer diameter of photonic crystal fiber 40 is about 40 µm. Solid core 72 and solid clad 74 are typically made of silica, plastic, or similar dielectric materials known to those skilled in the art.

Figure 2B:
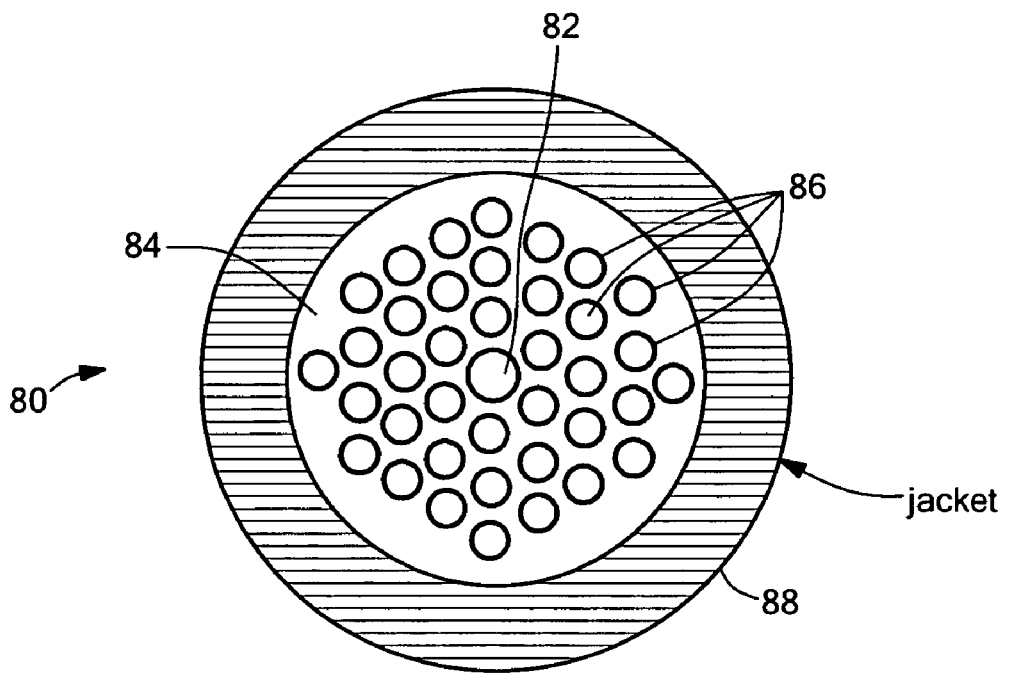

Photonic crystal sensing coil 16, FIG. 1 may also be formed with band gap fiber 80, FIG. 2B which includes hollow core region 82 surrounded by solid clad 84. Solid clad 84 includes a plurality of hollow channels 86 which create a band gap effect which confines the majority of light in hollow core region 82. Band gap fiber 80 is also typically configured to propagate a single mode of light. Band gap fiber 80 may also include jacket 88. Band gap fiber 80 has similar dimensions to photonic crystal fiber 70, supra. Clad 84 of band gap fiber 80 is ideally made of silica, plastic, or similar dielectric materials known to those skilled in the art.

Figure 2C:
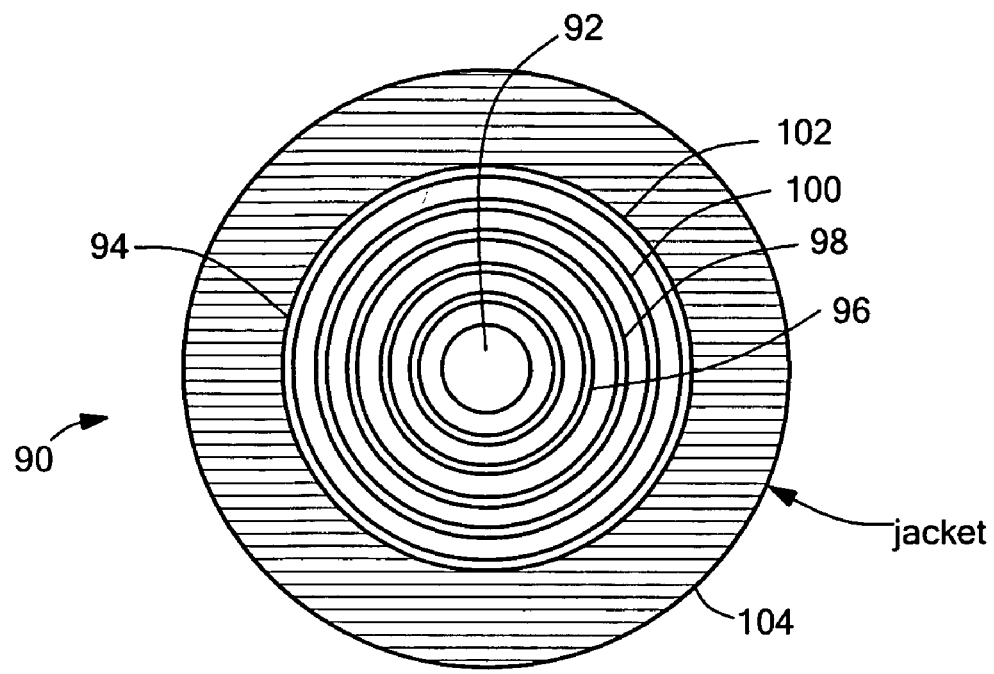

Band gap fiber 90, FIG. 2C may also be used to form photonic crystal sensing coil 16, FIG. 1. Band gap fiber 90 includes hollow core region 92 surrounded by a solid clad 94 which includes a plurality of alternating layers of solid dielectric material, such as alternating layers 96, 98, 100, and 102, which are configured to create a band gap effect that confines the majority of light in hollow core region 92. Band gap fiber 90 is also configured to propagate a single mode of light. In one example, plurality of alternating layers 96–102 are made of layers of dielectric material whose index of refraction alternates between a high value and a low value. Solid clad 94 includes alternating layers 96–102 and functions similar to that of the cladding of the photonic and band gap crystal fibers described above. Alternating layers 96–102 may be made from chalcogenide glasses and thermoplastic polymer. Chalcogenide glasses are based on the chalcogen elements sulfur, selenium and tellurium, and the addition of other elements, such as germanium, arsenic, and antimony, lead to the formation of stable glasses. An example of a suitable thermoplastic polymer includes a high glass-transition temperature thermoplastic polymer, such as poly-ether-sulphone (PES). Band gap fiber 90 typically includes jacket 104 surrounding clad 94. Band gap fiber 90 also has similar dimensions as band gap fiber 80, FIG. 2B.

Figure 2D:
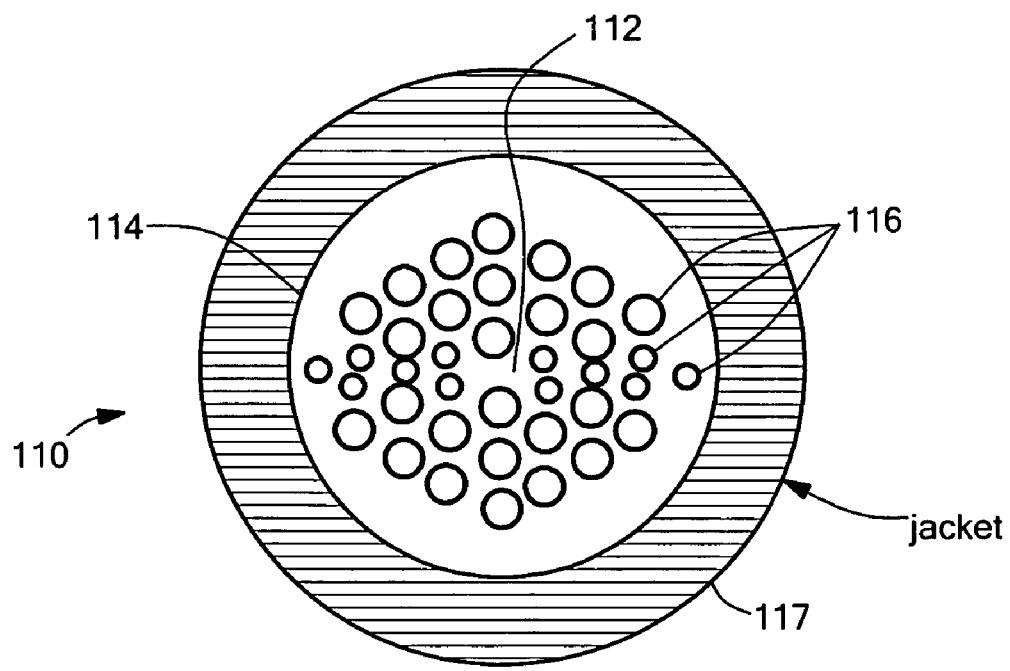
Figure 3A:
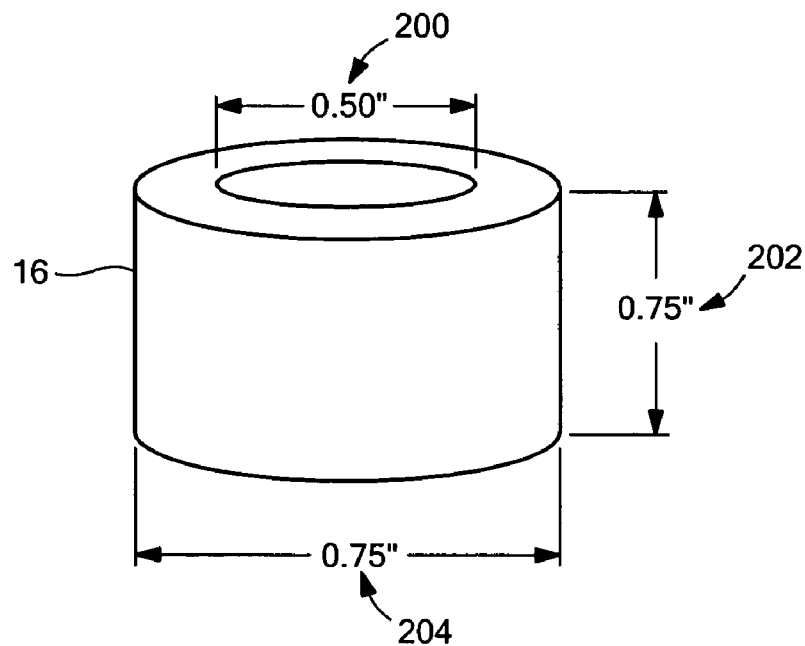
FIGS. 3A and 3B are schematic three-dimensional views of two exemplary embodiments of the sensing coil shown in FIG. 1.

Photonic crystal sensing coil 16, FIG. 1 may also be formed by winding a photonic crystal fiber 110, FIG. 2D which maintains polarization of light as it propagates and propagates only one state of light. This design propagates only one state of light and is one way to insure the light has traveled exactly the same path in each direction around photonic crystal sensing coil 16, FIG. 3. Photonic crystal fiber 110 includes asymmetric solid core region 112 surrounded by solid clad 114. Solid clad 114 includes plurality of asymmetrically spaced hollow channels 116 about asymmetric solid core region 112. Plurality of hollow channels 116 produce an effective index of refraction difference between solid core region 112 and solid clad 114 to confine light by totally reflecting the light on plurality of hollow channels 116 of clad 114. The asymmetric spacing of hollow channels 116 and asymmetric core 112 also maintains the polarization of light and propagates only one state of light. Solid core 112 and clad 116 are typically made of silica, plastic, or similar dielectric materials known to those skilled in the art. Photonic crystal fiber 110 typically includes jacket 117, surrounding clad 114 and has similar dimensions to the photonic crystal fibers and band gap of the photonic crystal sensing coil 16 discussed above.

Figure 2E:
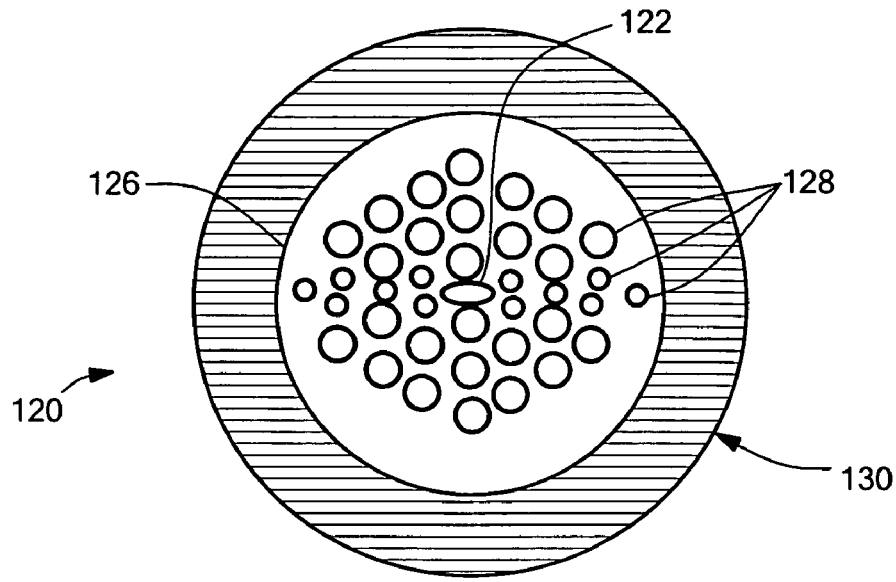

Band gap fibers which maintain the polarization of light and propagate only one state light may also be used to form photonic crystal sensing coil 16. For example, band gap fiber 120, FIG. 2E includes asymmetrical hollow region for core 122 surrounded by solid clad 126 which includes plurality of asymmetrically spaced hollow channels 128 that create a band gap effect that confines a majority of light in hollow core 122 while maintaining the polarization of light and propagating only one state of polarization. Solid clad 126 is ideally made of silica, plastic, or similar dielectrics. Band gap fiber 120 may also include jacket 130 and has similar dimensions to band gap fibers or photonic crystal fibers described above.

Figure 2F:
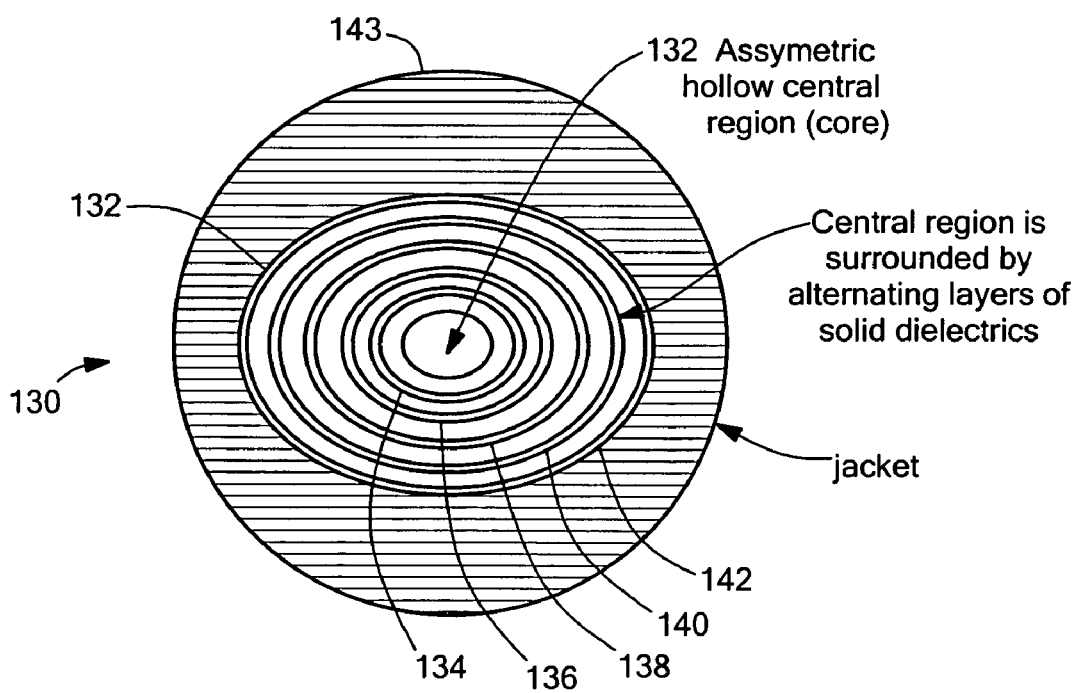

Photonic crystal sensing coil 16, FIG. 1 may also be formed with band gap fiber 130, FIG. 2F which is configured to maintain the polarization of light and maintain only one state of polarization light. Fiber 130 includes asymmetric hollow core region 132 surrounded by solid clad 133 having a plurality of alternating asymmetric layers of solid dielectric material, such as asymmetric layers 134, 136, 138, 140, and 142 to produce a band gap effect which confines a majority of light and hollow core 132 while maintaining the polarization of light and propagates only one state of light. Layers 134–142 are made of layers of dielectric material whose index of refraction alternates between a high value and a low value. The alternating layers of solid structure clad 133 may be made of chalcogenide glasses and thermoplastic polymer. Chalcogenide glasses are based on the chalcogen elements sulfur, selenium and tellurium and the addition of other elements, such as germanium, arsenic, and antimony leads to the formation of stable glasses. A suitable thermoplastic polymer might be the high glass-transition temperature thermoplastic polymer, poly-ether-sulphone (PES). Band gap fiber 130 may also include jacket 143 and has similar dimensions to the band gap fibers discussed above.

Photonic crystal sensing coil 16, FIG. 1 is typically formed by winding the photonic crystal fibers or the band gap fiber, as delineated above and shown in FIGS. 2A–2F, onto a mandrel or into a free standing coil. In one embodiment of this invention, photonic crystal sensing coil 16 includes 15,000 turns of photonic crystal fiber 70 or 110, FIGS. 2A and 2D, respectively, or band gap fiber 80, 90, 120, 130, FIGS. 2B, 2C, 2E, and 2F, respectively. As discussed above, using the photonic crystal fibers or band gap fibers with reduced outer diameter (e.g., 40 or 70 μm) to form photonic crystal sensing coil 16, FIG. 1 reduces the package size of photonic crystal IFOG system 10. For example, photonic crystal sensing coil 16, FIG. 3A has an outer diameter of approximately 0.75 inches, as indicated at 204, an inner diameter of about 0.5 inches, as indicated at 200, a height of approximately 0.75 inches, as indicated at 202, which results in a total package size of photonic crystal IFOG system 10 of about one cubic inch. To achieve the same precision or ARW a conventional IFOG made with non-photonic crystal fiber would have to be significantly larger, and would have a volume of approximately ten cubic inches.

Figure 3B:
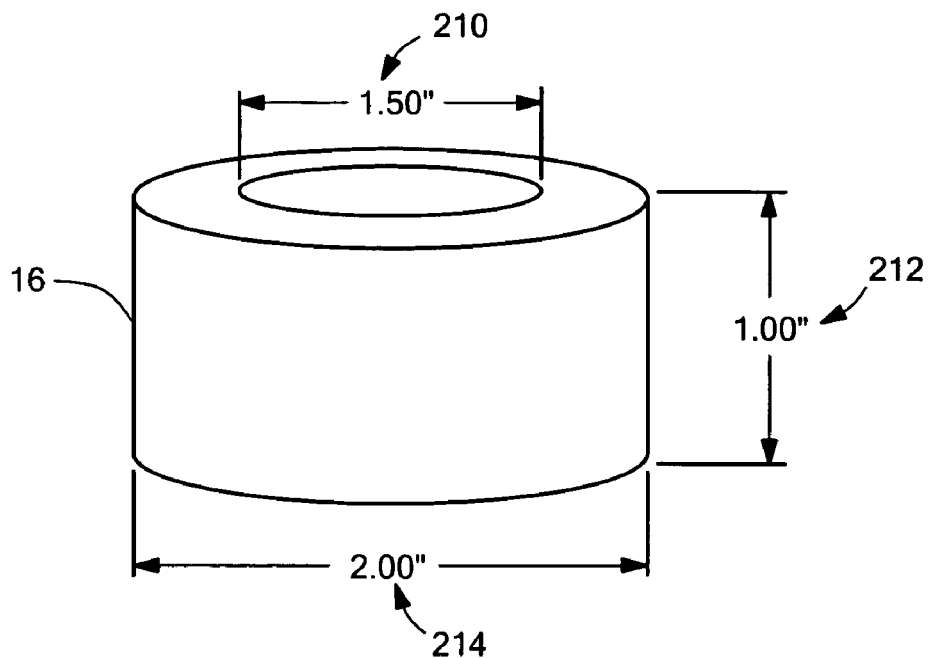

Photonic crystal sensing coil 16, FIG. 3B may be a medium sized coil which includes about 35,000 turns of the photonic crystal or band gap fibers delineated above. In this example, photonic crystal sensing coil 16 has an inner diameter of approximately 1.5 inches, as indicated at 210, a height of about 1 inch, as indicated at 212, and an outer diameter of about 2.0 inches as indicated at 214, resulting in a package size of system 10 of about ten cubic inches. With this size coil and package size, photonic crystal IFOG system 10 can measure the angular rate with twenty times the precision of a comparable size conventional non-photonic crystal IFOG because the ARW for the photonic crystal IFOG system 10 would be twenty time smaller than a conventional IFOG of similar dimension.

The result of using advance photonic crystal fibers and band gap fibers as discussed above and shown in FIGS. 2A–2F to manufacture photonic crystal sensing coil 16, FIG. 1 of photonic crystal IFOG 10 of this invention significantly reduces the package size of system 10. The advanced photonic crystal or band gap fibers with reduced diameter in photonic crystal sensing coil 16 also reduces ARW (e.g., improves accuracy) because ARW is proportional to the square of fiber diameter. The photonic crystal fibers and band gap fibers also reduce bend loss, reduce length loss, are radiation insensitive, are thermal insensitive, and eliminate the need to dope the optical fibers.

Photonic crystal interferometric fiber optical gyroscope system 10 may also include optical wave guide 300, FIG. 1 configured to interconnect light source 12 and beam controlling device 20 and/or interconnect beam controlling device 20 and photonic crystal sensing coil 16. Although wave guide 300 as shown in FIG. 1 to interconnects light source with beam controlling device 20 and beam controlling device 20 to photonic crystal sensing coil 16, this is not a necessary limitation of this invention, as light source 12 may be directly coupled to beam controlling device 20 and beam controlling device 20 may be directly coupled to photonic crystal sensing coil 16. Optical wave guide 300 may be a solid structure that confines light by total internal reflection (e.g., a conventional optical fiber), a photonic crystal wave guide having a gas-solid structure that confines light by total internal reflection (e.g., a photonic crystal fiber described above), as discussed above, or a band gap wave guide that confines light by employing optical band gap (e.g., a band gap fiber as described above).

Figure 2G:
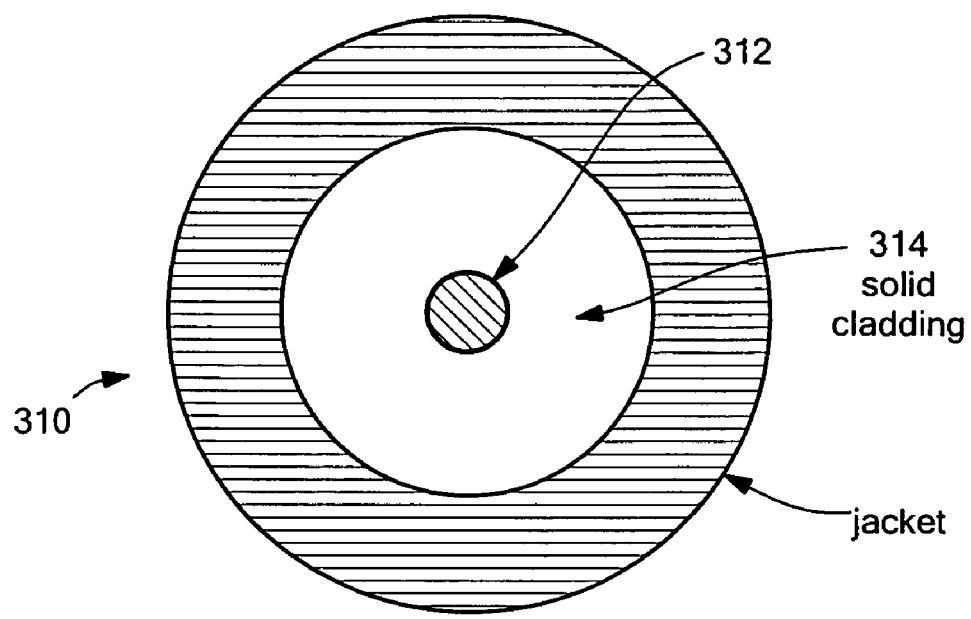
FIGS. 2G–2H are schematic two-dimensional views showing optical fibers which may be used to interconnect the various components of the photonic crystal interferometric fiber optical gyroscope shown in FIG. 1.
Figure 2H:
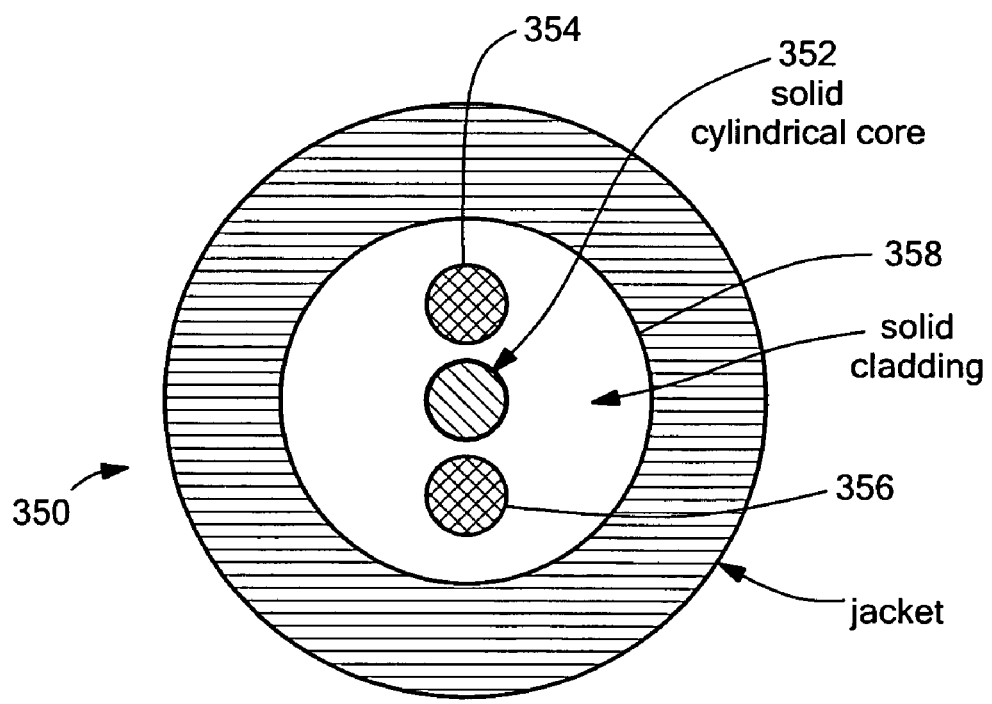

In one design, optical wave guide 300 may be configured as a conventional optical fiber, such as optical fiber 310, FIG. 2G, which includes solid core 312 surrounded by solid clad 314 that confines light in solid core 312 by totally reflecting all light in solid core 312 on solid clad 314. In other examples, optical wave guide 300 may be optical fiber which is configured to maintain the polarization of light and to propagate one state of polarization, such as conventional optical fiber 350, FIG. 2H which includes solid cylindrical core 352 surrounded by asymmetrically spaced solid rods 354 and 356 within clad 358. Fiber 350 is designed such that the index of refraction difference between core 352 and clad 358 confines light by total internal reflection while maintaining the polarization of light and propagating only one state of polarization of light.

Figure 4:
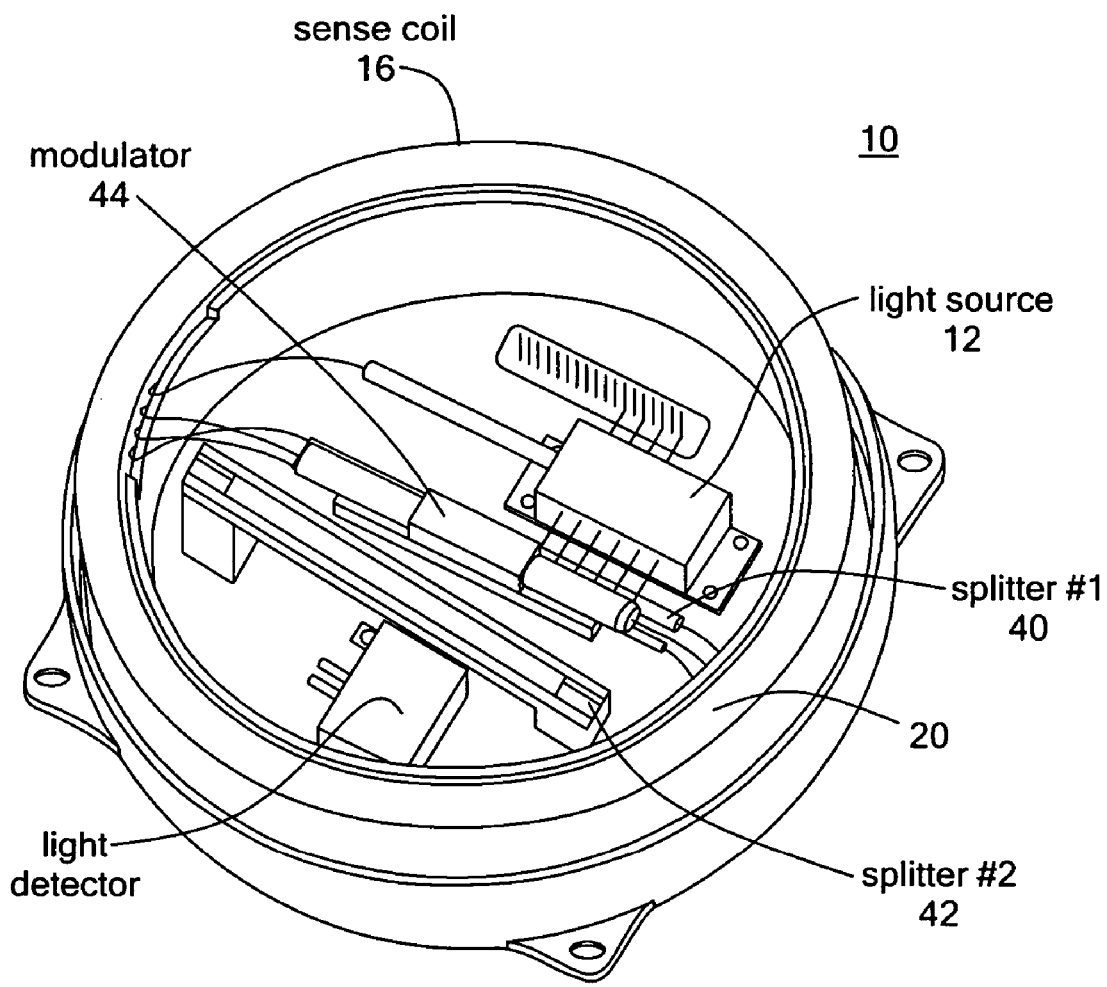
FIG. 4 is a schematic three-dimensional view of one embodiment of a photonic crystal interferometric optical gyroscope system in accordance with this invention.

One example of photonic crystal interferometric optical gyroscope system 10 of this invention is shown in FIG. 4 and depicts light source 12, source splitter 40, coil splitter 42, modulator 44, light detector 60, and photonic crystal sensing coil 16.

Figure 5:
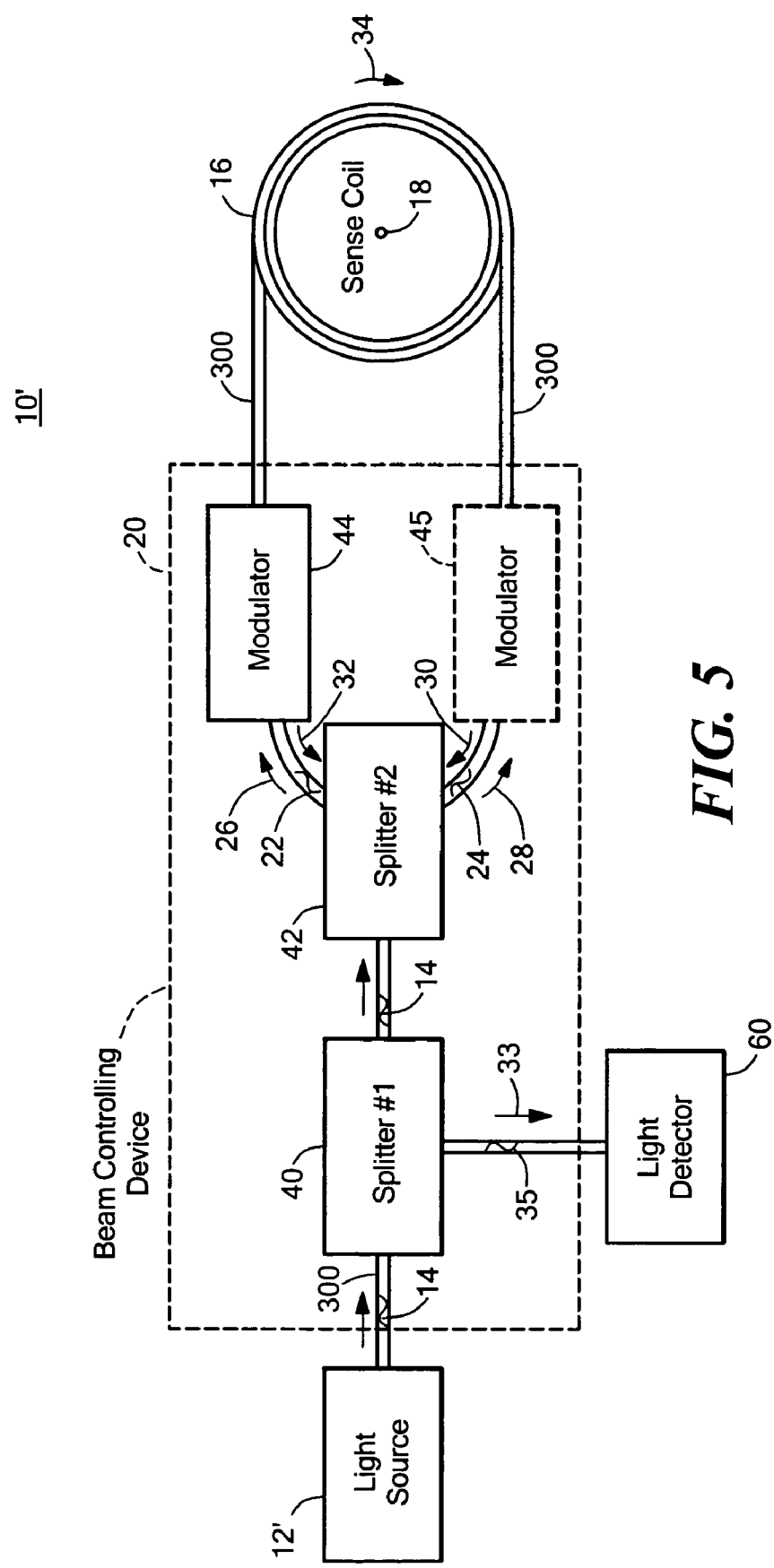
FIG. 5 is a schematic block diagram of another embodiment of a photonic crystal interferometric fiber optical gyroscope system employing a light source with increased spectral width in accordance with this invention.

In one preferred embodiment of this invention, light source 12', FIG. 5, where like parts have been given like numbers, may be configured as a broad-band light source, such as a tungsten-halogen light source available from Ocean Optics, Dunedin, Fla., to provide light 14 with an increased spectral width, such as light with a spectral width up to about 1500 nm, e.g., between about 100 to 1500 nm. In a preferred embodiment, light source 12' emits light 14 with a spectral width of about 1200 nm. As discussed in the Background section, increasing spectral width of light 14 (and corresponding counter propagating beams 22 and 24) decreases the ARW because ARW is inversely proportional to the square root of the spectral width of the light in photonic crystal sensing coil 16. Because light source 12' emits light 14 with increased spectral width to photonic crystal sensing coil 16, the ARW is significantly reduced. In one example, such as sensing coil 16, FIG. 3A, the ARW is reduced to 0.001 degrees per square root hours (degree/$\sqrt{hr}$). In other examples, such as sensing coil 16, FIG. 3B, the ARW is as low as 0.00005 degree/$\sqrt{hr}$, which is about twenty times lower than a conventional IFOG utilizing conventional narrow band optical fibers. When compared to a conventional prior high performance gyroscope, e.g., an inertial grade gyroscope which has as a maximum spectral width of about 30 nm, IFOG system 10' of this invention with light source 12' emitting light 14, in one example, with a spectral width of about 1200 nm results in a significant reduction of ARW. In this example, the ARW is reduced by a factor of about 6.3 (e.g., 1/$\sqrt{30}$ nm versus 1/$\sqrt{1200}$ mn.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A photonic crystal interferometric optical gyroscope system comprising:
   a light source for providing a primary beam of light;
   a photonic crystal sensing coil having a rotational axis; and
   a beam controlling device configured to split said primary beam into first and second counter-propagating beams in said photonic crystal sensing coil and configured to direct return of said counter-propagating beams wherein the power of said returning counter-propagating beams represents the phase shift between said counter-propagating beams and is indicative of the rate of rotation of said coil about said rotational axis.

2. The system of claim 1 in which said photonic crystal sensing coil is formed by winding a photonic crystal fiber having a gas-solid structure that confines said light by total internal reflection.

3. The system of claim 1 in which said photonic crystal sensing coil is formed by winding a band gap fiber which confines said light by employing an optical band gap.

4. The system of claim 2 in which said photonic crystal fiber is configured to maintain the polarization of said first and second counter-propagating beams.

5. The system of claim 2 in which said photonic crystal fiber is configured to propagate only one state of polarization of said first and second counter-propagating beams.

6. The system of claim 2 in which said photonic crystal fiber is configured to propagate a single mode of light.

7. The system of claim 3 in which said band gap fiber is configured to maintain the polarization of said light.

8. The system of claim 3 in which said band gap fiber is configured to propagate only one state of polarization of said light.

9. The system of claim 3 in which said band gap fiber is configured to propagate a single mode of light.

10. The system of claim 2 in which said photonic crystal sensing coil includes 15,000 turns of said photonic crystal fiber.

11. The system of claim 2 in which said photonic crystal sensing coil includes 35,000 turns of said photonic crystal fiber.

12. The system of claim 3 in which said photonic crystal sensing coil includes 15,000 turns of said band gap fiber.

13. The system of claim 3 in which said photonic crystal sensing coil includes 35,000 turns of said band gap fiber.

14. The system of claim 2 in which said photonic crystal fiber includes a solid core region surrounded by solid clad having a plurality of hollow channels configured to provide an index of refraction difference between said solid core region and said clad that confines light in said core by totally reflecting light on said clad and propagates a single mode of light.

15. The system of claim 14 further including a jacket surrounding said clad.

16. The system of claim 14 in which said photonic crystal fiber has an outer diameter in the range of about 20 to 250 microns.

17. The system of claim 14 in which said photonic crystal fiber has an outer diameter in the range of about 70 microns.

18. The system of claim 14 in which said photonic crystal fiber has an outer diameter of about 40 microns.

19. The system of claim 14 in which said solid core and said clad are made of silica, and/or plastic, and/or a dielectric material.

20. The system of claim 3 in which said band gap fiber includes a hollow core region surrounded by a solid clad including a plurality of hollow channels configured to define a band gap which confines the majority of light in said hollow core region and propagates a single mode of light.

21. The system of claim 20 further including a jacket surrounding said clad.

22. The system of claim 20 in which said band gap fiber has an outer diameter in the range of about 20 to 250 microns.

23. The system of claim 20 in which said band gap fiber has an outer diameter of about 70 microns.

24. The system of claim 20 in which said band gap fiber has an outer diameter of about 40 microns.

25. The system of claim 20 in which said clad is made of silica, and/or plastic, and/or a dielectric material.

26. The system of claim 3 in which said band gap fiber includes a hollow core region surrounded by solid clad having a plurality of alternating layers of solid dielectric material, said alternating layers of dielectric material configured to create a band gap effect that confines the majority of light in said hollow core region and propagates a single mode of light.

27. The system of claim 26 in which said band gap fiber further includes a jacket surrounding said clad.

28. The system of claim 26 in which said band gap fiber has an outer diameter in the range of about 20 to 250 microns.

29. The system of claim 26 in which said band gap fiber has an outer diameter of about 70 microns.

30. The system of claim 26 in which said band gap fiber has an outer diameter of about 40 microns.

31. The system of claim 26 in which said alternating layers of solid dielectric material includes silica and/or plastic.

32. The system of claim 26 in which said alternating layers of solid dielectric material includes a material chosen from the group consisting of: silica, doped silica, fluoride glasses, chalcogenide glasses and thermoplastic polymers.

33. The system of claim 4 in which said photonic crystal fiber includes an asymmetric solid core region surrounded by a solid clad having a plurality of asymmetrically spaced hollow channels about said solid core region to provide an index of refraction difference between said core region and said clad that confines said light by totally reflecting light on said hollow channels of said clad and maintains said polarization of said light.

34. The system of claim 7 in which said band gap fiber includes an asymmetric hollow region surrounded by a solid clad having a plurality of asymmetrically spaced hollow channels configured to define a band gap effect that confines the majority of light in said hollow core and maintains said polarization of said light.

35. The system of claim 7 in which said band gap fiber includes an asymmetric hollow core region surrounded by a plurality of alternating asymmetric layers of solid dielectric material configured to define a band gap effect that confines the majority of light in said core region and maintains said polarization of said light.

36. The system of claim 5 in which said photonic crystal fiber includes an asymmetric solid core region surrounded by a solid clad having a plurality of asymmetrically spaced hollow channels about said solid core region configured to provide an index of refraction difference between said core region and said clad that confines light by totally reflecting light on said hollow channels of said clad and propagates said one state of polarized light.

37. The system of claim 8 in which said band gap fiber includes an asymmetric hollow region surrounded by a solid clad having a plurality of asymmetrically spaced hollow channels configured to define a band gap that confines the majority of light in said hollow core and propagates said one state of polarized light.

38. The system of claim 8 in which said band gap fiber includes an asymmetric hollow core region surrounded by clad including a plurality of alternating asymmetric layers of solid dielectric material configured to define a band gap that confines the majority of light in said core region and propagates one state of polarized light.

39. The system of claim 1 in which photonic crystal sensing coil has an outer diameter, an inner diameter, and a height, said outer diameter in the range of about 0.5 inches to 9 inches, said inner diameter in the range of about 0.5 to 8 inches, and said height in the range of about 0.25 to 4 inches.

40. The system of claim 39 in which photonic crystal sensing coil has an outer diameter of about 2.0 inches, an inner diameter of about 1.5 inches, and a height of about 1.0 inch.

41. The system of claim 39 in which photonic crystal sensing coil has an outer diameter of about 0.75 inches, an inner diameter of about 0.5 inches, and a height of about 0.75 inches.

42. The system of claim 1 further including an optical wave guide configured to interconnect said light source and said beam controlling device and/or said beam controlling device and photonic crystal sensing coil.

43. The system of claim 42 in which said optical wave guide is chosen from the group consisting of: a solid structure wave guide that confines said light by total internal reflection, a photonic crystal wave guide having a gas-solid structure that confines said light by total internal reflection, and a band gap wave guide that confines said light by employing an optical band gap.

44. The system of claim 43 wherein said solid structure wave guide is configured as an optical fiber, said photonic crystal wave guide is configured as photonic crystal fiber, and said band gap wave guide is configured as a band gap optical fiber.

45. The system of claim 44 in which said optical fiber, said photonic crystal fiber, and said band gap fiber are configured to maintain the polarization of said light.

46. The system of claim 44 in which said optical fiber, said photonic crystal fiber, and said band gap fiber are configured to propagate only one state of polarization of said light.

47. The system of claim 44 in which said optical fiber, said photonic crystal fiber, and said band gap fiber are configured to propagate a single mode of light.

48. The system of claim 1 in which said beam controlling device includes first and second optical splitters and a least one phase modulator.

49. The system of claim 48 in which said first optical splitter is a reciprocal splitter.

50. The system of claim 48 in which said first optical splitter is a non-reciprocal splitter.

51. The system of claim 48 in which said first optical splitter is configured to direct light from said light source to a coil splitter and direct the return of said first and second counter-propagating beams from said sensing coil to a light detector.

52. The system of claim 51 in which said first optical splitter is configured as a broad-band splitter to transmit light with a spectral width up to about 1500 nm.

53. The system of claim 51 in which said second optical splitter is a reciprocal splitter.

54. The system of claim 48 in which said second optical splitter is configured to divide said light from said light source into two equal said first and second counter-propagating beams.

55. The system of claim 48 in which said at least one phase modulator is configured to add a time dependent phase shift to said first and second counter-propagating beams to produce a phase shift between said first and second counter-propagating beams such that said first and second counter-propagating beams constructively interfere to modify said power thereby improving the precision of said system.

56. The system of claim 1 further including a photo detector configured to convert said power to an electrical signal.

57. The system of claim 56 in which said photo detector is chosen from the group consisting of: a PIN photo detector, an avalanche photo detector, a photo multiplier tube, a bolometer, a photo resistive detector, and a photo conductive detector.

58. The system of claim 1 in which said light source provides said primary beam of light having a wavelength in the range of about 100 nm to 15,000 nm.

59. The system of claim 1 in which said light source provides said primary beam of light having a wavelength of about 1200 nm.

60. The system of claim 59 in which said light source is chosen from the group consisting of: an amplified spontaneous emission light source, a stimulated emission light source, a thermally excited light source, a fluorescent light source, an electro-luminescence light source, a chemical luminescence light source, and a phosphorescence light source.

61. The system of claim 60 in which said amplified spontaneous emission light source includes a semiconductor material.

62. The system of claim 60 in which said amplified spontaneous emission light source includes a gas filled fiber, and/or a rare earth doped fiber.

63. The system of claim 62 in which said gas is chosen from the group consisting of: argon, helium, neon, carbon monoxide and carbon dioxide.

64. The system of claim 60 in which said amplified spontaneous emission light source includes a liquid filled fiber.

65. The system of claim 64 in which said liquid includes an organic dopant.

66. The system of claim 60 in which said stimulated emission light source includes a laser.

67. The system of claim 60 in which said stimulated emission light source is chosen from the group consisting of: a helium-neon doped fiber with a cavity, an argon doped fiber with a cavity, a carbon dioxide doped fiber with a cavity, and a semiconductor material with a cavity.

68. The system of claim 60 in which said thermally excited light source includes an incandescent light bulb.

69. The system of claim 60 in which said fluorescent light source includes a fluorescent light bulb.

70. The system of claim 1 in which said light source is a broad-band light source which emits light with a spectral width up to about 1500 mn.

71. The system of claim 1 in which said light source is a broad-band light source which emits light with a spectral width of about 1200 nm.

72. The system of claim 1 in which said photonic crystal sensing coil has an ARW of about 0.001 degree/$\sqrt{hr}$.

73. The system of claim 1 in which said photonic crystal sensing coil has an ARW of about 0.00005 degree/$\sqrt{hr}$.

74. A photonic crystal interferometric optical gyroscope system comprising:
a broad-band light source for providing a primary beam of light with increased spectral width;
a photonic crystal sensing coil having a rotational axis; and
a beam controlling device configured to split said primary beam into first and second counter-propagating beams in said photonic crystal sensing coil and configured to direct return of said counter-propagating beams; wherein the power of said returning counter-propagating beams represents the phase shift between said counter-propagating beams and is indicative of the rate of rotation of said coil about said rotational axis.

75. The system of claim 74 in which said light source is a tungsten-halogen light source.

76. The system of claim 74 in which said primary beam of light has a spectral width up to about 1500 nm.

77. The system of claim 74 in which said photonic crystal sensing coil is formed by winding a photonic crystal fiber having a gas-solid structure that confines said light by total internal reflection.

78. The system of claim 74 in which said photonic crystal sensing coil is formed by winding a band gap fiber which confines said light by employing an optical band gap.

79. The system of claim 77 in which said photonic crystal fiber is configured to maintain the polarization of said first and second counter-propagating beams.

80. The system of claim 77 in which said photonic crystal fiber is configured to propagate only one state of polarization of said first and second counter-propagating beams.

81. The system of claim 77 in which said photonic crystal fiber is configured to propagate a single mode of light.

82. The system of claim 78 in which said band gap fiber is configured to maintain the polarization of said light.

83. The system of claim 78 in which said band gap fiber is configured to propagate one state of polarization of said light.

84. The system of claim 78 in which said band gap fiber is configured to propagate a single mode of light.

* * * * *